(12) United States Patent
Ye et al.

(10) Patent No.: US 11,319,440 B2
(45) Date of Patent: *May 3, 2022

(54) DUAL CURE POLYTHIOETHER

(71) Applicant: 3M INNOVATIVE PROPERTIES COMPANY, St. Paul, MN (US)

(72) Inventors: Sheng Ye, Woodbury, MN (US); Junting Li, Woodbury, MN (US); Yizhong Wang, Woodbury, MN (US); Joel D. Oxman, Minneapolis, MN (US); Susan E. DeMoss, Stillwater, MN (US); Jonathan D. Zook, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,253

(22) Filed: Jun. 12, 2020

(65) Prior Publication Data
US 2020/0308403 A1    Oct. 1, 2020

Related U.S. Application Data

(63) Continuation of application No. 15/533,758, filed as application No. PCT/US2015/067450 on Dec. 22, 2015, now Pat. No. 10,703,906.
(Continued)

(51) Int. Cl.
*C08L 81/02* (2006.01)
*B64D 45/02* (2006.01)
(Continued)

(52) U.S. Cl.
CPC .............. *C08L 81/02* (2013.01); *B05D 3/02* (2013.01); *B64D 45/02* (2013.01); *C08F 8/34* (2013.01);
(Continued)

(58) Field of Classification Search
CPC ........ C09J 181/02; C08G 75/12; C08G 75/04; C08G 75/02; C08G 75/00; C08G 18/04;
(Continued)

(56) References Cited

U.S. PATENT DOCUMENTS 3,923,748 A    12/1975    Hutt
5,236,967 A    8/1993    Ohkawa
(Continued)

FOREIGN PATENT DOCUMENTS

JP    03-210364    9/1991
JP    05-194672    8/1993
(Continued)

OTHER PUBLICATIONS

Cole, "Redox Initiation of Bulk Thiol-Ene Polymerizations", Polymer Chemistry, 2013, vol. 04, pp. 1167-1175.
(Continued)

*Primary Examiner* — Shane Fang
(74) *Attorney, Agent, or Firm* — 3M Innovative Properties Company; Carlos M. Téllez Rodriguez

(57) ABSTRACT

Compositions that are curable to polythioether polymers are provided, comprising: a) a dithiol monomer; b) a diene monomer; c) a radical cleaved photoinitiator; d) a peroxide; and e) an amine; where the peroxide and amine together are a peroxide-amine redox initiator. In some embodiments, the amine is a tertiary amine. In some embodiments, the amine is selected from the group consisting of dihydroxyethyl-p-toluidine, N,N-diisopropylethylamine, and N, N, N', N", N"-pentamethyl-diethylenetriamine. In some embodiments, the peroxide is selected from the group consisting of di-tert-butyl peroxide, methyl ethyl ketone peroxide, and benzoyl peroxide. In some embodiments, the composition may additionally comprise a polythiol monomer having three or more thiol groups.

18 Claims, 1 Drawing Sheet

Related U.S. Application Data

(60) Provisional application No. 62/095,952, filed on Dec. 23, 2014.

(51) Int. Cl.
| | |
|---|---|
| *C08G 18/04* | (2006.01) |
| *C08G 75/02* | (2016.01) |
| *C09J 181/02* | (2006.01) |
| *C08L 81/00* | (2006.01) |
| *C08G 75/00* | (2006.01) |
| *B05D 3/02* | (2006.01) |
| *C08F 8/34* | (2006.01) |

(52) U.S. Cl.
CPC ............ *C08G 18/04* (2013.01); *C08G 75/00* (2013.01); *C08G 75/02* (2013.01); *C08L 81/00* (2013.01); *C09J 181/02* (2013.01)

(58) Field of Classification Search
CPC ..... C07C 321/18; C07C 323/14; C08L 81/02; C08L 81/00; B05D 3/02; C08F 8/34; B64D 45/02
See application file for complete search history.

(56) References Cited

U.S. PATENT DOCUMENTS

| 2002/0115743 | A1* | 8/2002 | Karim ................ A61K 6/083 |
| | | | 523/115 |
| 2004/0029995 | A1 | 2/2004 | Klee |
| 2004/0247792 | A1 | 12/2004 | Sawant |
| 2006/0175005 | A1 | 8/2006 | Sawant |
| 2008/0160320 | A1 | 7/2008 | Beck |
| 2011/0319559 | A1 | 12/2011 | Kania |
| 2013/0084543 | A1 | 4/2013 | Liska |

FOREIGN PATENT DOCUMENTS

| JP | 08-143747 | 6/1996 |
| JP | 11-343304 | 12/1999 |
| JP | 2013-509462 | 3/2013 |
| WO | WO 2005-000965 | 1/2005 |
| WO | WO 2009-137197 | 11/2009 |
| WO | WO 2011/002876 | 1/2011 |
| WO | WO 2012-021781 | 2/2012 |
| WO | 2013/013589 A1 | 1/2013 |
| WO | WO 2013-090988 | 6/2013 |
| WO | WO 2013-151893 | 10/2013 |
| WO | WO 2014/066315 | 5/2014 |
| WO | WO 2014-151708 | 9/2014 |
| WO | WO 2011/051034 | 10/2014 |
| WO | WO 2014-164103 | 10/2014 |
| WO | WO 2014-164244 | 10/2014 |
| WO | WO 2014-172305 | 10/2014 |
| WO | WO 2015-102967 | 7/2015 |

OTHER PUBLICATIONS

Ikemura, "A Review of Our Development of Dental Adhesives—Effects of Radical Polymerization Initiators and Adhesive Monomers on Adhesion", Dental Materials Journal, 2010, vol. 29, No. 2, pp. 109-121.

"New Technologies for Modern Coating Material Process" 1st Edition, Liu Guojie, pp. 235, China Light Industry Press.

"Monomers and Polymers of Organosilicone", 1st Edition, Department of Personnel and Education, Ministry of Chemical Industry, pp. 27-29, Chemical Industry Press.

International Search Report for PCT International Application No. PCT/US2015/067450, dated Mar. 17, 2016, 5 pages.

Studer, et al., "Redox and photoinitiated crosslinking polymerization, III. Clear and pigmented acrylic coatings", Progress in Organic Coatings, 54, 2005, pp. 230-239.

"Calcium carbonate", [updated on the internet on Feb. 2, 22], [retrieved from the internet on Feb. 15, 22], <https://en.wikipedia.org/wiki/Calcium_carbonate>, pp. 16.

"Filler (materials)", [updated on the internet on Nov. 27, 21], [retrieved from the internet on Feb. 15, 22], <https://en.wikipedia.org/wiki/Filler_(materials)#Nanofillers>,pp. 8.

"Actinism", [upated on the internet on Jul. 6, 21], [retrieved from the internet on Feb. 11, 22], <https://en.wikipedia.org/wiki/Actinism>, pp. 3.

"Dichtungsmasse", Römpp, 9$^{th}$ Ed., 1990, vol. 2, p. 950.

Notice of Opposition, dated Mar. 10, 2022, pp. 16.

* cited by examiner

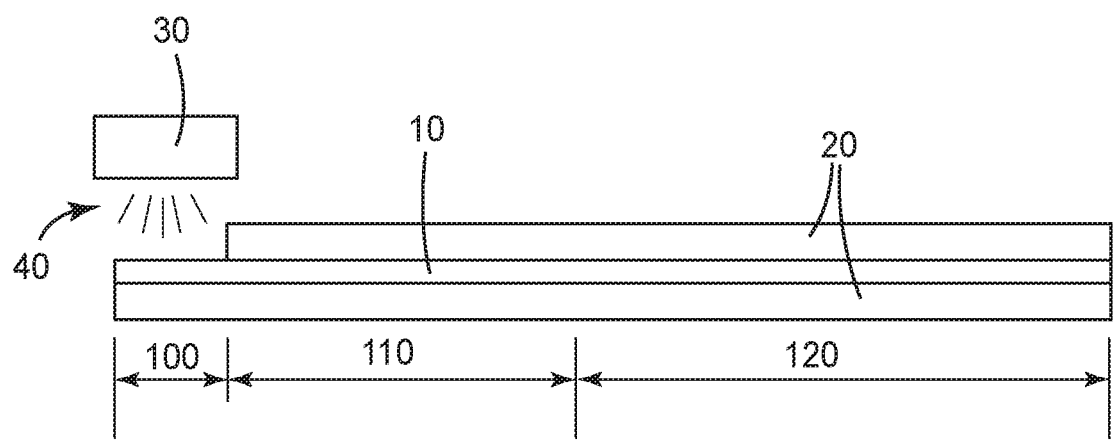

DUAL CURE POLYTHIOETHER

CROSS REFERENCE TO RELATED APPLICATIONS

This application is a continuation of U.S. application Ser. No. 15/533,758 filed Jun. 7, 2017, which is a national stage filing under 35 U.S.C. 371 of PCT/US2015/067450, filed Dec. 22, 2015, which claims the benefit of Provisional Application No. 62/095,952, filed Dec. 23, 2014, the disclosure of which is incorporated by reference in its/their entirety herein.

FIELD OF THE DISCLOSURE

This disclosure relates to compositions that cure to form polythioether polymers and that include a dual cure curing mechanism, as well as sealants comprising the same.

SUMMARY OF THE DISCLOSURE

Briefly, the present disclosure provides compositions that are curable to polythioether polymers, comprising: a) a dithiol monomer; b) a diene monomer; c) a radical cleaved photoinitiator; d) a peroxide; and e) an amine; where the peroxide and amine together are a peroxide-amine redox initiator. In some embodiments, the amine is a tertiary amine. In some embodiments, the amine is selected from the group consisting of dihydroxyethyl-p-toluidine, N,N-diisopropylethylamine, and N, N, N', N", N"-pentamethyl-diethylenetriamine. In some embodiments, the peroxide is selected from the group consisting of di-tert-butyl peroxide, methyl ethyl ketone peroxide, and benzoyl peroxide. In some embodiments, the composition may additionally comprise a polythiol monomer having three or more thiol groups. In some embodiments, the composition may additionally comprise one or more fillers. In some embodiments, the composition may additionally comprise one or more nanoparticle fillers. In some embodiments, the composition may additionally comprise calcium carbonate. In some embodiments, the composition may additionally comprise nanoparticle calcium carbonate. In some embodiments, the composition may be cured by application of light from an actinic light source. In some embodiments, the composition may be cured by application of light from a blue light source. In some embodiments, the composition may be cured by application of light from a UV light source.

In another aspect, the present disclosure provides sealants comprising curable compositions according to the present disclosure. In another aspect, the present disclosure provides seals obtained by cure of such sealants.

In another aspect, the present disclosure provides polythioether polymers obtained by cure of any the compositions according to the present disclosure. In some embodiments, the polythioether polymer has a Tg less than −50° C. In some embodiments, the polythioether polymer exhibits high jet fuel resistance characterized by a volume swell of less than 30% and a weight gain of less than 20% when measured according to Society of Automotive Engineers (SAE) International Standard AS5127/1.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

BRIEF DESCRIPTION OF THE DRAWING

FIG. 1 is a diagram representing the use of a dual cure polythioether according the the present invention as a sealant between two substrates.

DETAILED DESCRIPTION

The present disclosure provides a dual cure polythioether material such as a sealant. In some embodiments the sealant has both cure on demand properties and dark cure properties. In some embodiments the sealant may be cured by exposure to actinic radiation in 120 seconds or less, in some embodiments 90 seconds or less, in some embodiments 60 seconds or less, in some embodiments 30 seconds or less, and in some embodiments 20 seconds or less. In some embodiments cure on demand can be initiated with UV light, in some with visible light, in some with LED sourced UV light, and in some with LED sourced visible light. Furthermore, in some embodiments the initially photoinitiated cure propagates by a dark cure mechanism into adjacent portions of the polythioether material that are without light access. In some embodiments cure propagates by at least 2.5 cm into the dark zone with 90% or greater conversion in 120 seconds or less, in some embodiments 90 seconds or less, in some embodiments 60 seconds or less, in some embodiments 30 seconds or less, and in some embodiments 20 seconds or less. In some embodiments cure propagates by at least 5.0 cm into the dark zone with 90% or greater conversion in 120 seconds or less, in some embodiments 90 seconds or less, in some embodiments 60 seconds or less, in some embodiments 30 seconds or less, and in some embodiments 20 seconds or less.

With reference to FIG. 1, in one embodiment of a sealant according to the present disclosure, sealant 10 is applied between opaque substrates 20. Actinic light 40 from actinic light source 30 is used to initiate cure of a portion of sealant 10 exposed to said light, in exposed zone 100. However, sealant 10 in dark zones 110 and 120 is not exposed to actinic light 40. Use of the dual cure initiation system of the present disclosure allows the initially photoinitiated cure to propagate by a dark cure mechanism into adjacent dark zones 110 and 120. In some embodiments, sealant in dark zone 110, representing the 2 inches (5 cm) immediately adjacent to exposed zone 100, is fully cured within 20 seconds, and cure continues further into dark zone 120.

In some embodiments, the initiation system includes a) a radical cleaved photoinitiator and b) a peroxide-amine redox initiator.

In some embodiments, the cured material has low glass transition temperature, in some embodiments less than −20° C., in some embodiments less than −30° C., in some embodiments less than −40° C., and in some embodiments less than −50° C. In some embodiments, the cured material has excellent fuel resistance properties. In some embodiments, the cured material combines low glass transition temperature of less than −50° C. with excellent fuel resistance properties. Thus, in certain embodiments this dual cure technology can be applied to aircraft or automobile sealant applications and may result in greater ease and speed of vehicle manufacture.

Selected Embodiments

The following numbered embodiments are intended to further illustrate the present disclosure but should not be construed to unduly limit this disclosure.
1. A composition that is curable to a polythioether polymer, comprising:
   a) a dithiol monomer;
   b) a diene monomer;
   c) a radical cleaved photoinitiator;
   d) a peroxide; and
   e) an amine;
   where the peroxide and amine together are a peroxide-amine redox initiator.
2. The composition according to embodiment 1 where the amine is a tertiary amine.
3. The composition according to any of the preceding embodiments where the amine is selected from the group consisting of dihydroxyethyl-p-toluidine, N,N-diisopropylethylamine, and N, N, N', N'', N'''-pentamethyl-diethylenetriamine.
4. The composition according to any of the preceding embodiments where the peroxide is selected from the group consisting of di-tert-butyl peroxide, methyl ethyl ketone peroxide, and benzoyl peroxide.
5. The composition according to any of the preceding embodiments additionally comprising:
   f) a polythiol monomer having three or more thiol groups.
6. The composition according to any of the preceding embodiments additionally comprising:
   g) at least one filler.
7. The composition according to any of the preceding embodiments additionally comprising:
   h) at least one nanoparticle filler.
8. The composition according to any of the preceding embodiments additionally comprising:
   j) calcium carbonate.
9. The composition according to any of the preceding embodiments additionally comprising:
   k) nanoparticle calcium carbonate.
10. The composition according to any of the preceding embodiments which is curable by actinic light source.
11. The composition according to any of the preceding embodiments which is curable by blue light source.
12. The composition according to any of the preceding embodiments which is curable by UV light source.
13. A sealant comprising the composition according to any of the preceding embodiments.
14. A polythioether polymer obtained by cure of any the composition according to any of embodiments 1-12.
15. The polythioether polymer according to embodiment 14 having a $T_g$ less than −50° C.
16. The polythioether polymer according to embodiment 14 or 15 which exhibits high jet fuel resistance characterized by a volume swell of less than 30% and a weight gain of less than 20% when measured according to Society of Automotive Engineers (SAE) International Standard AS5127/1.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:
° C.: degrees Centigrade
cm: centimeter
LED: light emitting diode
mL: milliliter
Mn: Molecular weight
mW: milliWatt
nm: nanometer
$T_g$: glass transition temperature
UV: ultraviolet Definitions Maximum Processing Time: The time taken for the thiol-ene curable composition to begin gelling.
Photo Cure Time: The cure time of the portion of thiol-ene curable composition exposed to light.
Dark Cure Time: The cure time of the portion of thiol-ene curable composition not exposed to light.
Redox Cure Time: The cure time for the portion of thiol-ene curable composition initiated by redox mechanism.
Dark Cure Distance: The length of thiol-ene composition dark cured, as measured from the leading edge of the opaque silicone rubber sheet.

Materials.

Abbreviations for the materials used in the examples are as follows:
A-200: A hydrophilic fumed silica, obtained under the trade designation "AEROSIL 200" from Evonik Industries AG, Essen, Germany.
BPO: Benzoyl peroxide.
CMP: 3-chloro-2-methyl-1-propene.
DABCO: 1,4-Diazabicyclo[2.2.2]octane, obtained under the trade designation "DABCO" from Air Products & Chemicals, Inc., Allentown, Pa.
DHEPT: dihydroxyethyl-p-toluidine.
DIPEA: N,N-diisopropylethylamine, obtained from Alfa Aesar, Ward Hill, Mass.
DMDO: 1,8-Dimercapto-3,6-dioxaoctane, obtained from Arkena, Inc., King of Prussia, Pa.
DSW: An aluminosilicate clay, obtained under the trade designation "DRAGONITE SELECT WHITE" from Applied Minerals, Inc., New York, N.Y.
DVE-3: Triethyleneglycol divinylether, obtained under the trade designation "RAPI-CURE DVE-3" from Ashland Specialty Ingredients, Wilmington, Del.
E-8220: A diglycidylether of bisphenol F, obtained under the trade designation "EPALLOY 8220" from Emerald Performance Materials, LLC, Cuyahoga Falls, Ohio.
I-819: Phenylbis(2,4,6-trimethylbenzoyl)phosphine oxide, obtained under the trade designation "IRGACURE 819" from BASF Corp., Florham Park, N.J.
MEHQ: Hydroquinone monomethyl ether.
MEKP: Methyl ethyl ketone peroxide, obtained from 3M Company, St. Paul, Minn.
PMETA: N, N, N', N'', N'''-pentamethyl-diethylenetriamine, obtained from TCI America, Portland, Oreg.

S-31: Nanoparticle (70-100 nm) calcium carbonate, obtained under the trade designation "SOCAL 31" from Solvay Chemicals, Inc., Houston, Tex.

TAC: Triallylcyanurate, obtained from Sartomer, Inc., Exton, Pa.

TBPO: di-tert-butyl peroxide, obtained from TCI America.

TEMPO: 2,2,6,6-tetramethyl-1-piperidinyloxy, obtained from Oakwood Products, Inc., West Columbia, S.C.

TPTMP: Trimethylolpropane tris(3-mercaptopropionate).

TVCH: 1,2,4-Trivinylcyclohexane, obtained from BASF Corp., Florham Park, N.J.

TVBT: tris[4-(vinyloxy)butyl]trimellitate, obtained from Allied Signal, Inc., Morristown, N.J.

VAZO 52: 2,2'-azobis(2,4-dimethyl-pentanenitrile), obtained under the trade designation "VAZO 52" from E.I. du Pont de Nemours and Company, Wilmington, Del.

VAZO 67: 2,2'azobis-(2-methylbutyronitrile), obtained under the trade designation "VAZO 67" from E.I. du Pont de Nemours and Company.

Polythioethers were synthesized as follows:

PTE-1. Into a 1000-mL round bottom flask equipped with an air-driven stirrer, thermometer, and a dropping funnel, was added 392.14 grams (2.15 moles) DMDO and 82.23 grams (0.25 moles) E-8220. To this mixture was added 0.15 grams DABCO. The system was flushed with nitrogen, then mixed and heated for four hours at 60-70° C. 12.5 grams (0.05 moles) TAC was added, followed by approximately 0.15 grams VAZO 67. With continuous stirring, the mixture was heated to 60° C., and held at this temperature for approximately 30-45 minutes. 313.13 grams (1.55 moles) DVE-3 were slowly added drop-wise to the flask over a period of 45-60 minutes, keeping the temperature at approximately between 68-80° C. Additional VAZO 67 was added in approximately 0.15 gram increments over approximately 6 hours, for a total of approximately 0.6 grams. The temperature was raised to 100° C. and the material degassed for approximately 10 minutes. The resultant polythioether was approximately 3200 Mn with a 2.2 functionality.

PTE-2. Into a 500 mL four-neck, round bottom flask fitted with a stirrer, thermometer, chilled water condenser and a pressure equalizing addition funnel was added 206.54 grams of a 20% aqueous solution of sodium hydroxide (1.033 moles). To this was added, drop wise with stirring, 94.08 grams (0.51 moles) DMDO, and the mixture then allowed to cool to approximately 21° C. 96.4 grams (1.065 moles) CMP was added drop wise with vigorous stirring, and stirring continued for another 2 hours. The mixture was then held at 21° C. for approximately 16 hours, after which 150 grams of a clear layer was decanted. NMR analysis confirmed the decanted layer to be CMP diene.

Into a 100-mL round bottom flask equipped with an air-driven stirrer, thermometer, and a dropping funnel, was added 39.64 grams (0.22 moles) DMDO and 4.10 grams (0.0125 moles) E-8220. To this mixture was added 0.02 grams DABCO. The system was flushed with nitrogen, then mixed and heated for 1.5 hours at 60-70° C. 3.66 grams (0.0125 moles) CMP diene was added followed by approximately 0.01 grams VAZO 52. With continuous stirring, the mixture was heated to 60° C., and held at this temperature for approximately 1.5 hrs. 0.83 grams (0.005 mole) TVCH were added and the temperature maintained for another 1.5 hrs. 31.80 grams (0.157 moles) DVE-3 were slowly added drop-wise to the flask over a period of 45-60 minutes, keeping the temperature at approximately 70° C. Additional VAZO 52 was added in approximately 0.01 gram increments over approximately 16 hours, for a total amount of about 0.4 grams. The temperature is raised to 100° C. and the material degassed for approximately 10 minutes. The resultant polythioether was approximately 3200 Mn with a 2.2 functionality.

Example 1

Part A was prepared by dissolving 0.0139 grams BPO and 0.0300 grams 1-819 in 3.0000 grams DVE-3 in a 20 mL amber vial, on a roll mill for 40 minutes at 21° C. Part B was prepared by dissolving 0.0139 grams DHEPT and 0.0394 grams 1-819 in 3.9407 grams TPTMP in a 20 mL amber vial, also on a roll mill for 8 hours at 21° C. Part A was then added to Part B and manually stirred for one minute until homogeneously dispersed.

Examples 2-8

The procedure generally described in Example 1 for preparing homogeneous mixtures of peroxide, photo initiator and vinyl monomer in Part A, and amine, photo initiator and thiol monomer in Part B, was repeated according to the formulations listed in Tables 1A and 1B.

Example 9

Part A was prepared by dissolving 0.0347 grams BPO and 0.1549 grams 1-819 in 15.0000 grams DVE-3 in a 20 mL amber vial, on a roll mill for 40 minutes at 21° C. The solution was transferred to a speed mixer jar. 0.1000 grams A-200 and 5.3111 grams clay were added to the solution and homogeneously dispersed by means of a high speed mixer at 2,000 rpm for one minute. Part B was prepared by dissolving 0.0347 grams DIPEA and 0.1974 grams 1-819 in 19.7034 grams TPTMP in a 40 mL amber vial, also on a roll mill for 40 minutes at 21° C. The solution was transferred to a speed mixer jar. 0.1000 grams A-200 and 1.8916 grams clay were added to the solution and homogeneously dispersed by means of the high speed mixer at 2,000 rpm for one minute. Part A and Part B were homogeneously dispersed through a static mixer.

Example 10

The procedure generally described in Example 9 for preparing homogeneous mixtures of Part A and Part B was repeated according to the formulations listed in Tables 1A and 1B.

Example 11

The procedure generally described in Example 1 for preparing homogeneous mixtures of Part A and Part B was repeated according to the formulations listed in Tables 1A and 1B.

Example 12

0.0694 grams 1-819 was dissolved in a mixture of in 3.0000 grams DVE-3 and 3.9407 grams TPTMP in a 20 mL amber vial, on a roll mill for 40 minutes at 21° C.

Example 13

The procedure generally described in Example 1 for preparing homogeneous mixtures of Part A and Part B was repeated according to the formulations listed in Tables 1A and 1B.

Example 14

0.0765 grams 1-819 was dissolved in a mixture of in 4.0000 grams DMDO and 3.3467 grams TAC in a 20 mL amber vial, on a roll mill for 40 minutes at 21° C.

Example 15

The procedure generally described in Example 1 for preparing homogeneous mixtures of Part A and Part B was repeated according to the formulations listed in Tables 1A and 1B, wherein Part B was mixed for 24 hours rather than 8 hours.

Example 16

The procedure generally described in Example 1 for preparing homogeneous mixtures of Part A and Part B was repeated according to the formulations listed in Tables 1A and 1B.

Teflon™ mold. A 8.4 cm by 3.2 cm by 0.2 cm deep silicone rubber mold over a Teflon™ base, with an opaque silicone rubber sheet covering all but 2 cm of one end of the mold.

The curable composition was applied to the mold, an opaque silicone rubber sheet was then laid over the curable composition according to the dimensions described above. The remaining exposed area of the composition was then exposed to a 88 mW 455 nm LED light source, at a distance of 1.27 cm, for between 10-60 seconds. The following thiol-ene curing evaluations are listed in Tables 2 and 3.

TABLE 1A

| Example | Part A Composition (grams) | | | | | | | | | | | | | |
|---|---|---|---|---|---|---|---|---|---|---|---|---|---|---|
| | BPO | MEKP | I-819 | DVE-3 | MEHQ | TEMPO | TBPO | TVBT | A-200 | DSW | S-31 | DIPEA | DMDO | TAC | TMPTP |
| 1 | 0.0139 | 0 | 0.0300 | 3.0000 | 0 | 0 | 0 | 0 | 0 | 0 | 0 | 0 | 0 | 0 | 0 |
| 2 | 0.0139 | 0 | 0.0300 | 3.0000 | 0.0018 | 0 | 0 | 0 | 0 | 0 | 0 | 0 | 0 | 0 | 0 |
| 3 | 0.0278 | 0 | 0.0300 | 3.0000 | 0 | 0.0009 | 0 | 0 | 0 | 0 | 0 | 0 | 0 | 0 | 0 |
| 4 | 0.0139 | 0 | 0.0300 | 3.0000 | 0 | 0 | 0 | 0 | 0 | 0 | 0 | 0 | 0 | 0 | 0 |
| 5 | 0.0070 | 0 | 0.0300 | 3.0000 | 0 | 0 | 0 | 0 | 0 | 0 | 0 | 0 | 0 | 0 | 0 |
| 6 | 0 | 0 | 0.0300 | 3.0000 | 0 | 0 | 0.0139 | 0 | 0 | 0 | 0 | 0 | 0 | 0 | 0 |
| 7 | 0.0171 | 0 | 0.0554 | 0 | 0 | 0 | 0 | 5.5359 | 0 | 0 | 0 | 0 | 0 | 0 | 0 |
| 8 | 0.0171 | 0 | 0.0554 | 0 | 0 | 0 | 0 | 5.5359 | 0 | 0 | 0 | 0 | 0 | 0 | 0 |
| 9 | 0.0347 | 0 | 0.1549 | 15.0000 | 0 | 0 | 0 | 0 | 0.1000 | 5.3111 | 0 | 0 | 0 | 0 | 0 |
| 10 | 0.0532 | 0 | 0.1116 | 11.5000 | 0 | 0 | 0 | 0 | 0.3000 | 0 | 2.9669 | 0 | 0 | 0 | 0 |
| 11 | 0.0139 | 0 | 0.0600 | 6.0000 | 0 | 0 | 0 | 0 | 0 | 0 | 0 | 0 | 0 | 0 | 0 |
| 12 | 0 | 0 | 0.0694 | 3.0000 | 0 | 0 | 0 | 0 | 0 | 0 | 0 | 0 | 0 | 0 | 3.9407 |
| 13 | 0 | 0 | 0.0400 | 0 | 0 | 0 | 0 | 0 | 0 | 0 | 0 | 0.0153 | 4.0000 | 0 | 0 |
| 14 | 0 | 0 | 0.0765 | 0 | 0 | 0 | 0 | 0 | 0 | 0 | 0 | 0 | 4.0000 | 3.6467 | 0 |
| 15 | 0.0134 | 0 | 0.0035 | 0 | 0 | 0 | 0 | 0.3468 | 0 | 0 | 0 | 0 | 0 | 0 | 0 |
| 16 | 0 | 0.0230 | 0.0300 | 0.0624 | 0 | 0 | 0 | 0 | 0 | 0 | 0 | 0 | 0 | 0.1197 | 0 |

TABLE 1B

| Example | Part B Composition (grams) | | | | | | | | | | | | |
|---|---|---|---|---|---|---|---|---|---|---|---|---|---|
| | DHEPT | PMETA | I-819 | TPTMP | DIPEA | DMDO | A-200 | DSW | S-31 | BPO | TAC | PTE-1 | PTE-2 |
| 1 | 0.0139 | 0 | 0.0394 | 3.9407 | 0 | 0 | 0 | 0 | 0 | 0 | 0 | 0 | 0 |
| 2 | 0.0139 | 0 | 0.0394 | 3.9407 | 0 | 0 | 0 | 0 | 0 | 0 | 0 | 0 | 0 |
| 3 | 0.0278 | 0 | 0.0394 | 3.9407 | 0 | 0 | 0 | 0 | 0 | 0 | 0 | 0 | 0 |
| 4 | 0 | 0 | 0.0394 | 3.9407 | 0/0139 | 0 | 0 | 0 | 0 | 0 | 0 | 0 | 0 |
| 5 | 0 | 0 | 0.0394 | 3.9407 | 0.0070 | 0 | 0 | 0 | 0 | 0 | 0 | 0 | 0 |
| 6 | 0 | 0 | 0.0394 | 3.9407 | 0.0139 | 0 | 0 | 0 | 0 | 0 | 0 | 0 | 0 |
| 7 | 0.0171 | 0 | 0.0300 | 0 | 0 | 3.0000 | 0 | 0 | 0 | 0 | 0 | 0 | 0 |
| 8 | 0 | 0 | 0.0300 | 0 | 0.0171 | 3.0000 | 0 | 0 | 0 | 0 | 0 | 0 | 0 |
| 9 | 0 | 0 | 0.1974 | 19.7034 | 0.0347 | 0 | 0.1000 | 1.8916 | 0 | 0 | 0 | 0 | 0 |
| 10 | 0 | 0 | 0.1516 | 15.1059 | 0.0532 | 0 | 0.3000 | 0 | 1.0631 | 0 | 0 | 0 | 0 |
| 11 | 0 | 0 | 0.0788 | 7.8814 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 13 | 0 | 0 | 0.0365 | 0 | 0 | 0 | 0 | 0 | 0 | 0.0153 | 3.6467 | 0 | 0 |
| 14 | 0 | 0 | 0 | 0 | 0 | 0 | 0 | 0 | 0 | 0 | 0 | 0 | 0 |
| 15 | 0.0134 | 0 | 0.0300 | 0 | 0 | 0 | 0 | 0 | 0 | 0 | 0 | 3.0000 | 0 |
| 16 | 0 | 0.0160 | 0.0300 | 0 | 0 | 0 | 0 | 0 | 0 | 0 | 0 | 0 | 3.0000 |

Evaluations

The following molds were used for curing evaluations:

Glass mold. An elongate 25 cm by 1.27 cm by 0.1 cm deep silicone rubber mold over a glass base, with an opaque silicone rubber sheet covering all but 1.27 cm of one end of the mold.

Aluminum, fit glass and black coated wood molds. An elongate 10 cm by 1.27 cm by 0.1 cm deep silicone rubber mold over an aluminum, fit glass or black coated wood base, with an opaque silicone rubber sheet covering all but 1.27 cm of one end of the mold.

TABLE 2

| | | Cure Length (cm) After 60 second Exposure | |
|---|---|---|---|
| Example | Mold | Fully Cured | Partially Cured |
| 5 | Glass | 4 cm | 14 cm |
| 11 | Glass | 3 cm | 8 cm |
| 12 | Teflon | 7.6 cm | N/A |
| | Aluminum | 2.2 cm | N/A |
| | Black frit primed glass | 1.3 cm | N/A |

TABLE 2-continued

| | | Cure Length (cm) After 60 second Exposure | |
|---|---|---|---|
| Example | Mold | Fully Cured | Partially Cured |
| | Glass | 8 cm | 13 cm |
| | Black coated wood surface | 4 cm | 4 cm |
| 13 | Glass | 4 cm | 4.5 cm |
| | Black coated wood surface | 1 cm | 3 cm |
| 14 | Black coated wood surface | <1 cm | 1 cm |

TABLE 3

| Example | Approximate Maximum Processing Time (minutes) | Approximate Photo Cure Time (seconds) | Approximate Redox Cure Time (minutes) |
|---|---|---|---|
| 1 | 0 | N/A* | 0.25 |
| 2 | 0 | N/A* | 0.25 |
| 3 | 3 | 10 | 10 |
| 4 | 30 | 10 | 180-240 |
| 5 | 60 | 10 | 180-300 |
| 6 | 120-240 | 10 | 720-960 |
| 7 | 0 | N/A* | 0.25 |
| 8 | 15 | 10 | 180-240 |
| 9 | 60 | 60 | 180-300 |
| 10 | 30 | 60 | 180-240 |
| 15 | 0 | N/A* | 5 |
| 16 | 30 | 10 | 720-840 |

*N/A: The thiol-ene composition cured during the mixing step and could not be applied to the mold.

The Tg of photo-initiated and redox-initiated Examples 1, 7, and 15 were measured using a model "DSC Q2000" differential scanning calorimeter, obtained from TA Instruments, New Castle, Del. Results are listed in Table 4.

TABLE 4

| | Tg (° C.) | |
|---|---|---|
| Example | Photo initiation | Redox initiation |
| 1 | −44° C. | −46° C. to −41° C. |
| 7 | −44° C. | −51° C. to −50° C. |
| 15 | −55° C. | −55° C. |

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A two-part composition that is curable to a polythioether polymer, comprising the following the components in a Part A and/or a part B:
    a) products from the reaction of at least one of each of: dithiol monomers, dienes, trienes, and epoxy resins;
    b) a diene monomer;
    c) a radical cleaved photoinitiator;
    d) a peroxide; and
    e) an amine;
wherein the peroxide and the amine are in different part from each other, and where the peroxide and amine together are a peroxide-amine redox initiator, wherein a polyether resulting from curing the composition has a glass transition temperature of lower than −40° C.

2. The composition according to claim 1 where the amine is a tertiary amine.

3. The composition according to claim 1, wherein component (a) further comprises a tertiary amine catalyst and a thermal free radical initiator.

4. The composition according to claim 1 where the amine is selected from the group consisting of dihydroxyethyl-p-toluidine, N,N-diisopropylethylamine, and N, N, N', N", N"-pentamethyl-diethylenetriamine.

5. The composition according to claim 1 where the peroxide is selected from the group consisting of di-tert-butyl peroxide, methyl ethyl ketone peroxide, and benzoyl peroxide.

6. The composition according to claim 1 additionally comprising:
    f) a polythiol monomer having three or more thiol groups.

7. The composition according to claim 1 additionally comprising:
    g) at least one filler.

8. The composition according to claim 1 additionally comprising:
    h) at least one nanoparticle filler.

9. The composition according to claim 1 additionally comprising:
    j) calcium carbonate.

10. The composition according to claim 1 additionally comprising:
    k) nanoparticle calcium carbonate.

11. The composition according to claim 1 which is curable by actinic light source.

12. The composition according to claim 1 which is curable by blue light source.

13. The composition according to claim 1 which is curable by UV light source.

14. A sealant comprising the composition according to claim 1.

15. A polythioether polymer obtained by cure of the composition according to claim 1.

16. The composition according to claim 4, where the peroxide is selected from the group consisting of di-tert-butyl peroxide, methyl ethyl ketone peroxide, and benzoyl peroxide.

17. The composition according to claim 3 additionally comprising:
    k) nanoparticle calcium carbonate.

18. The composition according to claim 16 additionally comprising:
    k) nanoparticle calcium carbonate.

* * * * *